(12) United States Patent
Wasiq et al.

(10) Patent No.: US 10,135,808 B1
(45) Date of Patent: Nov. 20, 2018

(54) PREVENTING INTER-APPLICATION MESSAGE HIJACKING

(71) Applicant: Amazon Technologies, Inc., Reno, NV (US)

(72) Inventors: Muhammad Wasiq, Vancouver (CA); Aleksandrs J. Rudzitis, Seattle, WA (US); Nima Sharifi Mehr, Vancouver (CA)

(73) Assignee: Amazon Technologies, Inc., Reno, NV (US)

( * ) Notice: Subject to any disclaimer, the term of this patent is extended or adjusted under 35 U.S.C. 154(b) by 114 days.

(21) Appl. No.: 14/964,959

(22) Filed: Dec. 10, 2015

(51) Int. Cl.
*H04L 29/06* (2006.01)

(52) U.S. Cl.
CPC .......... *H04L 63/0823* (2013.01); *H04L 63/10* (2013.01); *H04L 63/1408* (2013.01)

(58) Field of Classification Search
CPC ......... G06F 21/6218; G06F 2221/2105; G06F 21/554; G06F 21/566
See application file for complete search history.

(56) References Cited

U.S. PATENT DOCUMENTS

| | | | | |
|---|---|---|---|---|
| 7,861,295 B2* | 12/2010 | Ylitalo | .................. | G06F 21/554 455/410 |
| 9,384,337 B1* | 7/2016 | Sirbu | ................ | G06F 17/30165 |
| 2006/0080726 A1* | 4/2006 | Bodlaender | ............ | G06F 21/10 726/2 |
| 2007/0016958 A1* | 1/2007 | Bodepudi | ........... | G06F 21/6218 726/27 |
| 2009/0199122 A1* | 8/2009 | Deutsch | ................ | G06F 9/4443 715/771 |
| 2009/0210702 A1* | 8/2009 | Welingkar | .............. | H04L 9/321 713/156 |
| 2012/0151211 A1* | 6/2012 | Kreiner | ................. | H04L 63/102 713/168 |

* cited by examiner

*Primary Examiner* — Amir Mehrmanesh
(74) *Attorney, Agent, or Firm* — Hogan Lovells US LLP

(57) ABSTRACT

Various approaches discussed herein enable validation of an application on a computing device, such as a mobile computing device, prior to that application being invoked by activation of a link in another application. Upon activation of the link in a calling application, the computing device determines a target application to be invoked in response to the activation. Sensitive or confidential data, such as login credentials, may be included in the link to be passed to the target application. By validating either the calling or the target application, the data may be safeguarded by confirming an identity of an application associated with the link.

18 Claims, 8 Drawing Sheets

PREVENTING INTER-APPLICATION MESSAGE HIJACKING

BACKGROUND

People are increasingly using applications on computing devices, such as "apps" on a smartphone, to access content and perform computing tasks such as browsing the Internet, managing e-mail, shopping, and consuming news, "tweets," photos, and other data. Often, users of an application want to perform an action in another application that may be related to their current activity; for example, users browsing shoes for purchase on an e-commerce website in a mobile web browser, or receiving a link to the shoes in an email, may want to view and/or purchase a particular shoe in an application dedicated to the e-commerce website that may offer additional and/or enhanced functionality and/or a more streamlined environment. It can be difficult, however, to move easily between applications while safely transferring information as part of the process. For example, a computing device may determine to invoke a particular application in response to a user clicking on a link in a different application and transfer information to the invoked application as part of the process. While this approach may be an effective way to transfer information between applications, if the invoked application is malicious, then the information may be stolen or otherwise misused, for example.

BRIEF DESCRIPTION OF THE DRAWINGS

Various embodiments in accordance with the present disclosure will be described with reference to the drawings, in which.

DETAILED DESCRIPTION

Figure 1:
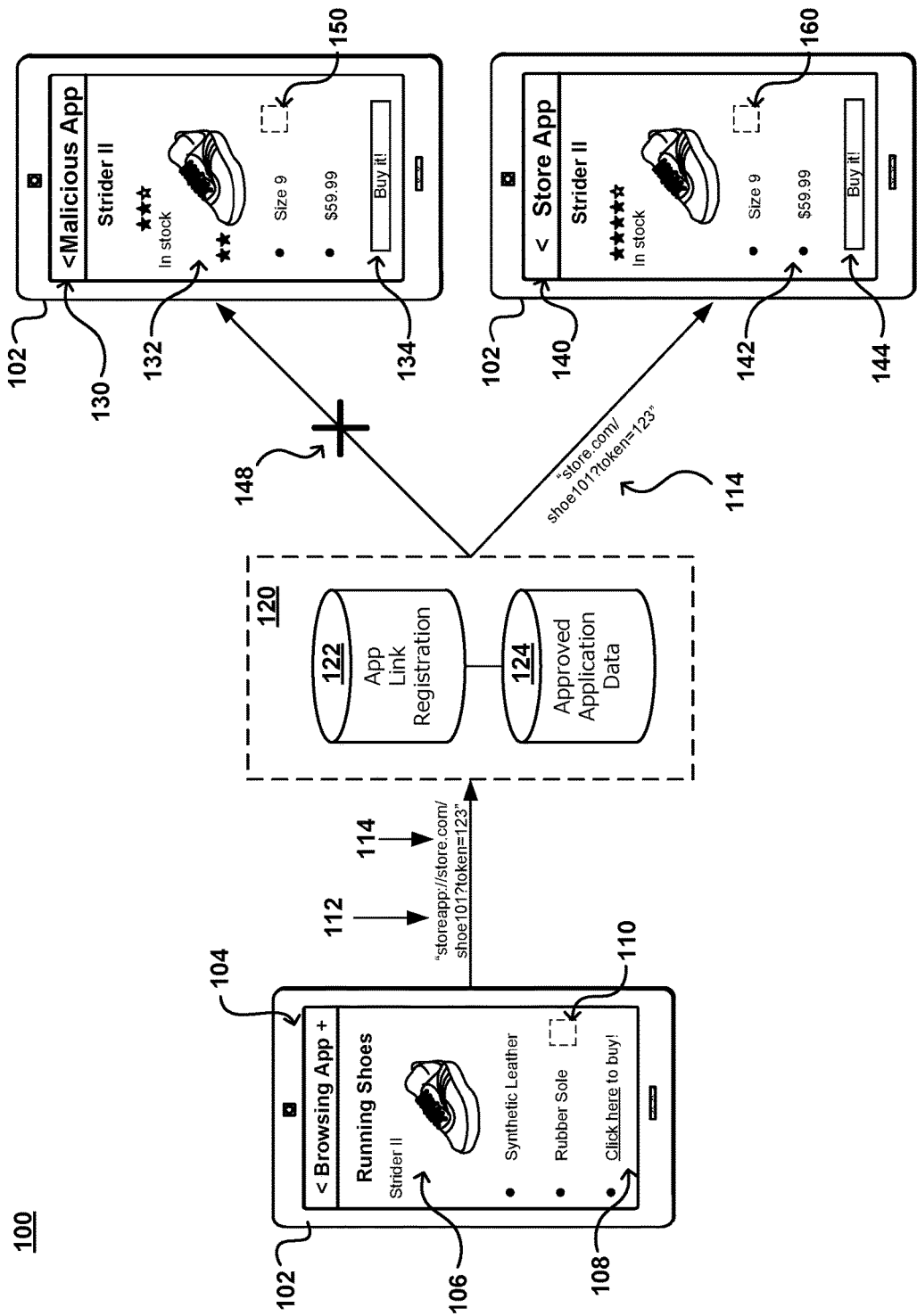
FIG. 1 illustrates an example situation wherein a target application is verified as an authorized application to invoke in response to activating a link, in accordance with various embodiments.

Systems and methods in accordance with various embodiments of the present disclosure may overcome one or more of the aforementioned and other deficiencies experienced in conventional approaches, for example for invoking applications and passing data between applications. In particular, various embodiments use a determination of information associated with applications to determine whether the application being invoked or doing the invoking can be trusted.

In various embodiments, a user might be accessing content through an application such as a Web browser, email client, or other such application, installed on a device such as a mobile device; e.g., a smart phone, tablet, etc. A link (e.g., uniform resource locator, hyperlink, etc.) may be displayed in the application, such as associated with a graphical element such as a button. Under conventional approaches, a user may select or otherwise activate the link in the application, which may be referred to as a "calling application." In response to the link being selected, another application associated with the link, which may be referred to as a "target application," may be invoked (e.g., be activated/executed and brought to the front) and data associated with the link (e.g., embedded in the link text, referenced by the link, etc.) passed to the target application. A drawback to current approaches is a lack of control over which target application is invoked in response to activating the link. Computing devices may have numerous applications (e.g., mobile phone or tablet apps), and new applications may be installed frequently. Each of these applications is a potential malicious application that may be designed to steal information and pass it to a different target than intended. For example, a malicious application may be designed to look similar to a well-known shopping application, and upon being installed on a user's device, causes the device to be configured in a way such that all links previously associated with the well-known shopping application will instead be associated with the malicious application. When the user activates a link, for example in a web browser application, that the user believes will activate the well-known shopping application so that the user may take an action with their account, the link will instead invoke the malicious application and pass the data associated with the link (e.g., login credentials, credit card information, secure tokens, etc.) to the malicious application, which may then transfer that confidential/private/sensitive data to a nefarious actor. In some implementations, the malicious application may quickly invoke the well-known shopping application, such that any visual transition on the device (e.g., applications being brought to the "front" or otherwise visually shifting or sliding, etc.) that may otherwise indicate the presence and operation of the malicious application may be minimized or eliminated, thereby increasing the risk to the user even further.

The techniques described herein address the aforementioned shortcomings, as well as improving the operation and performance of the computing device(s) on which they are implemented by, for example, increasing security, convenience, and efficiency of inter-application communications on a device. Example implementations of the disclosed techniques may verify that a target application is trusted (e.g., not a malicious application) by, upon selection of the link, determining and verifying information associated with the target application. This information may identify the source of the target application, an authority that issued a code signing certificate used to sign the target application, and/or other information that may be used by the disclosed techniques to determine that the target application may be trusted to be invoked and then receive the data associated with the link from the calling application.

The calling application may request to the device that the link be handled by a target application that it trusts, so the information associated with the target application may be compared to information provided by or specified by the calling application. For example, the calling application may request that the target application be signed with an approved code signing certificate (e.g., the same code signing certificate as the calling application, etc.) or the target application will be prevented from being invoked. In some implementations, multiple target applications may satisfy the required criteria, in which case the calling application may display a notification including the multiple target applications and the user may select one of the target applications to be invoked, as an example. Various types of data may be used both to indicate which target applications are acceptable, as well as making the determination that the target application is trusted. For example, the calling application may indicate to the computing device/system a list of target applications, or criteria satisfied by the target applications, that may properly be invoked. This may be performed by the calling application identifying these acceptable/trusted target applications, for example by name, publisher, or some other feature or characteristic, such as code signing certificates used to sign the target application, or other data that can be verified. These trusted target applications may be determined dynamically or ahead of time, and may be indicated to the device and/or system in various ways. For example, a whitelist may be maintained, locally and/or remotely, that provides a list of approved certificates. According to various embodiments, fingerprint data (e.g., a hash function output or output from another technique used to map an arbitrarily large data item (such as a list of applications, certificates, etc.) to a shorter bit string) may be generated that identifies a list of code signing certificates that the calling application trusts, and this fingerprint data may be transmitted, for example as part of the link data and used as part of a technique to verify that the target application is signed by one of the specified code signing certificates, and therefore may be trusted and invoked. The calling application or device/system may specify that the target application be signed by the same certificate as the calling application, or that the certificate used to sign the target application meets certain criteria, such as being part of the "chain" that signed the calling application; for example, being signed by an intermediary certificate that is associated with the calling application, or being issued by a common or approved (e.g., trusted) certificate authority, for example trusted by the platform or other entity, such as a remote entity. In various embodiments, approved or trusted certificates may be mapped or otherwise associated with various applications. For example, a calling application (or target application, depending on the embodiment) may indicate that it trusts one or more applications signed by a particular certificate or set of certificates; for example, all certificates signed by a particular certificate authority or authorities, intermediary certificates, or the like.

In some embodiments, the calling application may not care which application is registered as the target application, and in an example approach includes flag data (e.g., a predefined bit or bit sequence setting in a small data area that is used by a program to indicate a setting or action to be taken, etc.) in the data associated with the link which, when identified by the system, treats all applications on the device, or all applications invoked by the calling application, as if they are authorized pursuant to the techniques described herein. Other data may be included or otherwise added to the data associated with the link; for example, various criteria and/or constraints may be determined and added to the data, such as timestamps, expiration times/dates, etc., which may be evaluated upon activation of the link and used along with or in place of the techniques described herein to determine whether the target application should be invoked. In some implementations, a particular target application may be validated or otherwise determined to be trusted by a remote device, such as a server or cloud computing environment. In an approach, information capable of identifying the potential target application (e.g., code signing certificates, publishers, fingerprints, etc.) may be transmitted to another computing device, for example using an Application Programming Interface (API) executing on the other computing device. The other computing device makes a determination whether the proposed target application can be trusted (e.g., analyzing data sent with the request and/or stored at the other computing device, etc.) and transmits data back to the original device indicating whether the target application is a trusted/authorized application.

In some embodiments, a target application may determine whether the calling application should be trusted. For example, the target application may use the techniques described herein to evaluate a code signing certificate associated with the calling application before receiving and acting on a calling application's invocation request. Information may be provided with the link to enable the target application to make the determination; for example, a digital certificate (e.g., SSL certificate, etc.) associated with a Hyper Text Transfer Protocol Secure (HTTPS) connection used by the calling application may be evaluated for trust.

Various other applications, processes, and uses are presented below with respect to the various embodiments, each of which improves the operation and performance of the computing device(s) on which they are implemented by, for example, increasing security, convenience, and efficiency of inter-application communications on a device, such as a mobile computing device.

FIG. 1 illustrates an example situation 100 wherein a target application is verified as an authorized application to invoke in response to activating a link, in accordance with various embodiments. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, desktop computers, notebook computers, personal data assistants, cellular phones, video gaming consoles or controllers, smart televisions, a wearable computer (e.g., a smart watch or glasses), and portable media players, among others. In this example, the content 106 is being accessed using a webpage displayed in a Web browser 104 executing on the computing device 102.

The content in at least some embodiments is provided in an Internet-appropriate format, such as may rely upon an Internet protocol or hypertext markup language, for display in an application such as a Web browser "app" 104. This content thus can refer to content to be delivered over a network, such as the Internet, that can be displayed or otherwise presented in a general purpose browser application, such as a Web browser, or a mobile application (or "app"). Content may be provided in various forms, formats, or versions for different types of presentation, and a Web content version may be provided that is appropriate for general purpose browser applications. As known for webpages, content 106 is displayed that is determined using an address such as a uniform resource locator (URL) 104 (not shown). In this example, the content corresponds to a shoe available from an electronic marketplace.

In this example, the electronic marketplace provider also offers a mobile application 140 (or "app") that can also display content for that shoe. The mobile application 140 is tailored for the mobile environment, and in many cases can provide additional or enhanced functionality, such as one-click ordering or the ability to bookmark that content, that might not be offered through the webpage 106, even if that page is customized for mobile devices. The mobile application 140 can be configured to display or present a different version of the content 142, such as may be referred to as mobile "application content" or "dedicated content." Since the application 140 can provide specific functionality and features, the mobile application content 142 can be tailored to be presented via that application rather than forced to allow for a variety of functions and features as may be present from various devices through any of a set of general purpose browser applications. Although reference are made herein to "mobile applications" and "mobile environments," those of ordinary skill in art will recognize that the techniques described herein are not so limited, and may be utilized in various environments in which applications are being executed; for example, a web browser on a desktop computer as well as a mobile app on a cellphone.

In order to enable the user to easily access the content 106 in the dedicated mobile application 140, a link 108 may be generated and provided in the web browser 104 or other application that, when activated, invokes another application 130, 140 on the device. For clarity, the application in which the link 108 is presented will be referred to as the "calling application" and the application invoked in response to the link being activated will be referred to as the "target application," although these terms are illustrative rather than limiting. In some embodiments, the link 108 is determined and generated (e.g., by the system or the calling application 104 prior to displaying the content 106, while in other embodiments the link is dynamically generated.

According to various embodiments, the link 108 is part of a "URL scheme," which provides a common method to pass requests to other applications through Uniform Resource Locator (URL) links. By using a "URL scheme," an application (e.g., mobile "app" executing on a mobile device, an application executing on a desktop computing device, etc.) may be launched upon activating the link from another application, "app," or web application, for example. For example, an application can issue a request to load a link for a standard protocol (e.g., HTTP, FTP, etc.), and the platform will route the request to an application registered with the system for that protocol. For example, to handle an HTTP URL, the platform would typically launch a browser.

While "standard" protocols such as HTTP and FTP are commonly defined by the platform, custom URLs (e.g., links) may be created that have a custom format. Any application on the device can register with the device to be invoked (e.g., triggered, launched, etc.) upon these custom URLs being activated (e.g., clicked on, selected, etc. Whenever a custom URL is activated, the platform loads (e.g., invokes) the target application associated with the custom URL and can pass information to the target application. For example, if an application displays telephone numbers, a custom URL (link) may launch a "phone app" whenever someone taps one of those numbers. Clicking a link associated with a location (e.g., a business) may launch a "maps app" and provide directions to that location from your current location. When a user clicks a link, what happens is determined by the platform and/or the calling/target application.

As a general example, a link used with a URL scheme as discussed herein might take the form of, for example:
storeapp://
musicapp://
mapsapp://
Where "storeapp," "musicapp," and "mapsapp" refer to applications installed on the device that are invoked upon activation of the corresponding above link. For purposes of this disclosure, a portion of a link according to the techniques described herein that operates to identify and/or otherwise cause another application to be invoked (e.g., that is "registered" by an application with the platform) may be considered an "action portion." The above example links comprise solely an action portion. A link may also have other information included in or associated with the link, which may be considered a "data portion" of the link. This data portion may define specific actions to be performed as the target application opens, may comprise information such as variables, etc. that are to be passed to the target application upon invocation, may reference other data to be fetched and passed, etc. A link used with a URL scheme as discussed herein having an action portion and a data portion might take the form of, for example:
storeapp://store.com/shoe101?token=123
musicapp://play?artist=Adele
mapsapp://search?terms=Coffee+50.894967,4.341626
The first sample link above invokes the target application registered with the action portion "storeapp" and passes data to the invoked target application, such as a link to the shoe the user was browsing in the calling application, as well as a token that may be used for providing login credentials, for example. The second sample link above invokes the target application registered with the action portion "musicapp" and passes a command to the target application to begin playing songs by artist Adele. The third sample link above invokes the target application registered with the action portion "mapsapp" and passes a command to the target application to search for "coffee" in the vicinity of the device's current location defined by latitude and longitude. The above links are merely examples of syntax and form, as the techniques described herein are not limited to any particular form or format of link. Any type of link supported by a computing device on which the techniques are implemented may be utilized.

As illustrated above, sensitive and/or confidential data may be passed to a target application, which makes determining whether the target application that will be invoked and receive the data portion associated with the link is trustworthy an improvement in the performance and functionality of the computing device on which these techniques are performed. A shortcoming of the present approach is that the calling application cannot verify whether a trusted application is invoked in response to the link being activated. For example, mobile device platforms may all any application to "register" with the device to handle links associated with a particular action portion. In some cases, the last application to register for the action portion will be the application invoked upon activation. This allows a malicious application, once installed on a computing device, to register for particular URL schemes (e.g. action portions of links as understood herein) in place of the "expected" application, and the user is not aware of the change. The user will click on a link, for example thinking that doing so will invoke their usual shopping application, but instead, a malicious application has registered for the action portion and is invoked once the link is activated in the calling application. The data associated with the link, which may include sensitive and/or confidential information, is then passed to the malicious application, which is able to do with it what it wishes.

Turning back to the example of FIG. 1, a user is browsing content 106 in a web browsing application 104 on a mobile computing device 102. A link 108 is provided as part of the content 106 which, when activated by the user, will invoke a target application pursuant to the example implementations described above. The example link 108 may comprise an action portion 112 and a data portion 114. According to various embodiments, upon activation, the link 108 is transmitted to a data store 120 on the device (although in other embodiments, data store 120 may be located at a remote device) at which data describing application link registration 122 is stored regarding which target application is registered with the action portion 112, and data describing which target application are approved 124 is stored. Data store 120 may be comprised of more or fewer components than illustrated in the example of FIG. 1, and may operate not only to store and compare data, but also to receive and/or issue commands to the computing device 102 on which it operates or with which it is communicatively coupled.

In this example, once data store 120 receives the indication of the link 108 being activated and/or receives the action portion 112 and/or data portion 114, data associated with the calling application 104 and/or the target application(s) 130, 140 may be analyzed, for example by data store 120 and/or its components, such as the approved application data 124 component. For example, a malicious application 130 may have registered with the action portion 112 of the link, such that when the link 108 is activated, the application link registration 122 data indicates that the malicious application 130 should be invoked and the data portion 114 passed to it. As part of the techniques described herein, the potential target application 130, 140 may be validated before being invoked and having the data portion 114 transmitted to it. For example, malicious application 130 may have an identical "look and feel" to a valid application 140, displaying content 132 in a similar fashion to the "real" application 142, such that when a user invokes an action such as clicking a "buy it" button 134 which may look identical to a "buy it" button 144 in the valid application, any confidential information (e.g., credit card information, address information, etc.) input into the malicious application 130 (or transferred to it as part of the data portion 114) may be stolen. To make the deception more complete, malicious application 130 may be signed with a valid code signing certificate 150, although other types of code verification approaches are also envisioned (e.g., being signed with a particular resource, being associated with a particular source or other application already indicated as trusted, having data associated with the application that indicates a level of trust, etc.). This code signing certificate 150 is compared to approved certificate information, for example stored in approved application data 124. This comparison and analysis may be implemented in various ways; for example, approved certificate information identifying one or more approved code signing certificates may be maintained, and if the code signing certificate 150 used to sign the malicious application 130 is so identified, then malicious application 130 may be invoked and the data portion 114 passed to it.

In the example of FIG. 1, the approved application data 124 does not identify the code signing certificate 150 used to sign the malicious application 130; therefore, the request to invoke the malicious application 130 is denied 148. In the example of FIG. 1, a store application 140 may be registered to handle the link 108. In the example of FIG. 1, the store application 140 may be considered as an alternative scenario to malicious application 130, while in various embodiments, multiple applications may be registered with a particular action portion 112, and the techniques described herein utilized to select a "trusted" application. In other embodiments, a list of applications currently and previously registered to handle the link 108 may be maintained, such that if the current application registered to handle the link 108 is deemed "untrustworthy," such as malicious application 130 of FIG. 1, then another, previously registered application may be analyzed to see if it is "trusted," and if so, then that application may be invoked as the target application, and if some embodiments, be registered to handle the link 108 moving forward in place of malicious application 130.

In the example of FIG. 1, if store application 140 is registered with the action portion 112, then upon the link 108 being activated, the system may determine a code signing certificate 160 used to sign the store application 140 and compare it to approved certificate information, for example stored in approved application data 124. If the code signing certificate 160 used to sign the store application 140 is indicated as allowable pursuant to the approved application data 124, then store application 140 may be invoked and the data portion 114 passed to it.

While an embodiment uses code signing certificates (or similar authentication information associated with an application) to validate a target application prior to invoking the target application and/or forwarding (e.g. passing) data to the target application, this may be performed in various ways. For example, a calling application may specify that the target application be signed with the same code signing certificate 160 as the calling application 110. In various approaches, an application may be determined to be trusted if the code signing certificates of the calling and target applications are identical, as well as (or in addition to), one may be an intermediary certificate used to sign the other certificate, both may be issued by the same authority, or some other data indicating validity may be mandated by the calling application or by the platform/system/device. In an embodiment, the calling application may identify code signing certificates with which if the target application is signed, the target application may be considered trusted and therefore invoked. This identification of "trusted" certificates may be passed in the link 108, for example as a fingerprint or other type of hash or value. Once the link 108 containing the fingerprints of "trusted" certificates is received, then the certificate used to sign the target application is compared to the certificates references by the fingerprint. If there is a match, then the target application may be considered "trusted" or "authorized," such that the target application may be invoked. In another embodiment, prior to invoking the target application, the platform (e.g., device, system, etc.) may verify that the target application is signed by a code signing certificate specified as trusted, for example by the calling application or the platform.

According to an embodiment, the calling application (or the platform) may not have a preference for only a "trusted" application being invoked upon activation of the link 108. A flag, or similar piece of data, may be inserted into the link 108, such that when the flag is identified, for purposes of verifying whether a particular application is trusted, all applications executing on the device 102 may be considered as trusted.

In an embodiment, additional information (e.g., constraints) may be included with data associated with the link. For example, a timestamp or other time data, for example corresponding to activation of the link, may be added to the data associated with the link (e.g., the action portion and/or data portion, data referenced by the action portion and/or data portion, etc.), and may be compared to an expiration date/time or some type of time limit. If the time limit has expired, then the request to invoke the target application may be denied, even though in some instances the target application may have been determined to be trusted for invocation, as described herein.

In an embodiment, a determination may be made regarding whether the data portion 114 of a link 108 includes authentication credentials, such as a token, password, etc. In some embodiments, a determination may be made whether the data portion 114 contains a particular "level" of sensitive data; for example, a name and address or an email address may be considered one level of confidential, while a username and password, location information, or a secure token may be considered a different (e.g., higher) level of confidential. Based on the determination of the data portion 114 containing confidential information, or depending on the level of confidentiality associated with the data, various criteria associated with the target application must be satisfied in order for the target application to be invoked. For example, the target application may have to meet a certain number of criteria depending on the level of confidentiality of the data. Examples of criteria may include whether the target application is signed, and if so, by what resource; a time limit associated with the link; the target application being included in a "whitelist" of trusted applications; a relation of the target application to another application on the device that is considered trusted; whether the target application has been previously executed, and if so, how many times and/or how long has the target application been active; date of installation of the target application; whether the target application is configured to perform certain actions, such as send data to a particular location, invoke another application, etc.

Figure 2:
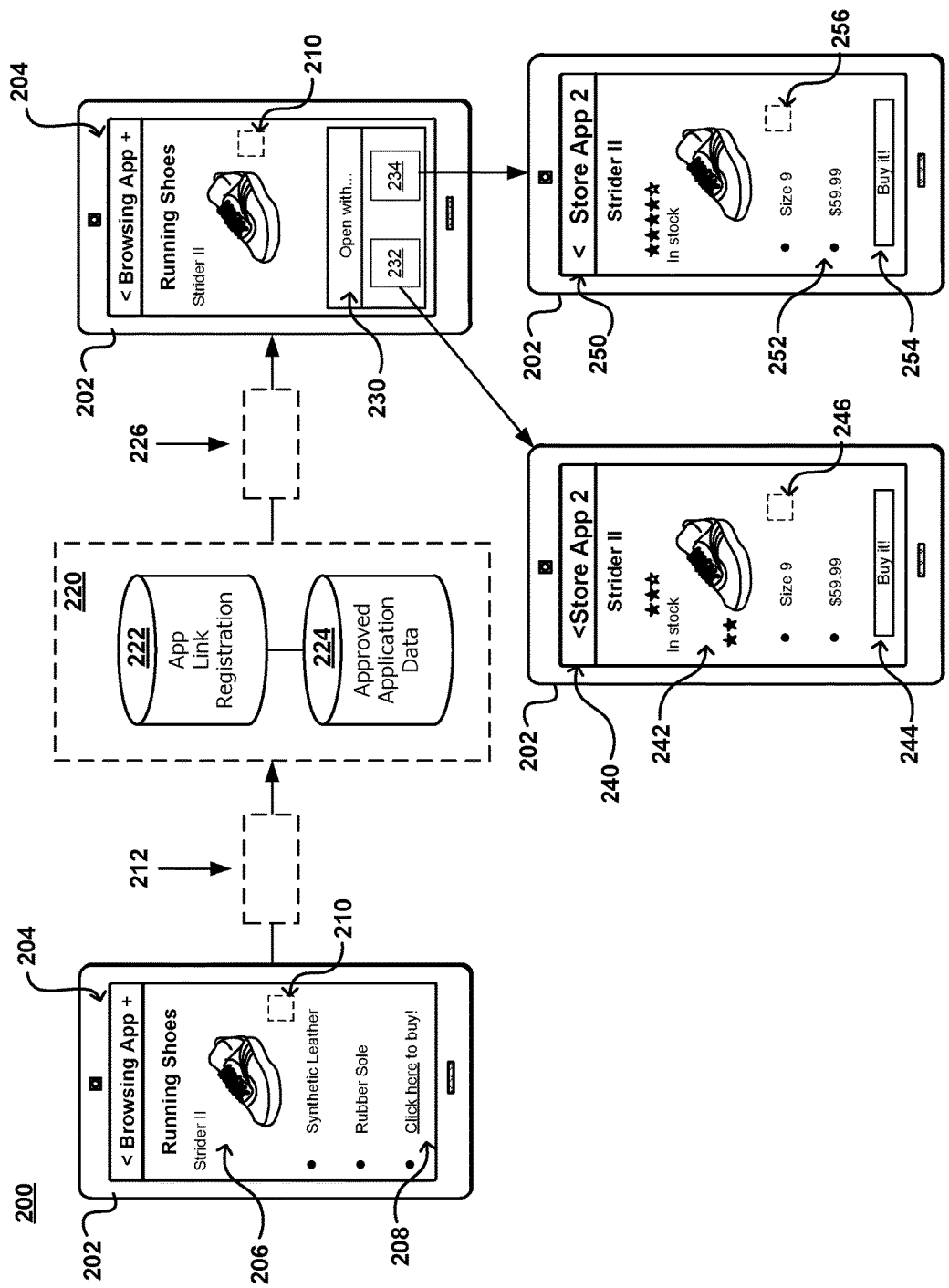
FIG. 2 illustrates an example situation wherein a user may be presented with a choice of authorized applications to invoke in response to activating a link, in accordance with various embodiments.

FIG. 2 illustrates an example situation 200 wherein a user may be presented with a choice of authorized applications to invoke in response to activating a link, in accordance with various embodiments. It should be understood that reference numbers are carried over between figures for similar components for purposes of explanation, but that such use should not be interpreted as a limitation on the various embodiments. In this example, a user of a computing device 202 executing a browsing application 204 is browsing content 206, such as a shoe the user may desire to purchase. The user clicks a link 208 in the browsing application, the link being part of a URL scheme as described herein. In response, data 212 associated with the link 108 (e.g., the action portion and or the data portion) is sent to a data store 220 or other component, either on the computing device 202 or remotely maintained.

As described herein, a determination is made regarding which application is registered (i.e., will be invoked) to handle the link, such as by analyzing application link registration data 222. In the example of FIG. 2, two applications 240, 250 are registered to handle the link 208. In this example, it is determined whether one, both, or none of the applications 240, 250 are "trusted" or "approved" applications. For example, whether the applications 240, 250 are signed with a code signing certificate 246, 256 that is designated as approved in the approved application data 224 or is otherwise indicated as approved, by either the calling application 204 or the system. In the example of FIG. 2, both applications are signed with code signing certificates 246, 256 that match the code signing certificate used to sign calling application 210, and therefore are designated as trusted. Data indicating this determination 226 is sent back to the calling application 204, which in an embodiment is caused to display an interface element 230 allowing a user to select 232, 234 which application she desires to handle the link. In various embodiments, a list of all applications registered (or in some embodiments, that have been registered and are currently registered) to handle the link may be presented, and the user is provided a way to select from the entire list for the application she chooses to handle the link. Some type of visual or other feedback may be presented with the list, for example to indicate which of the applications are approved and/or which applications are not. This feedback may be overridden by the user, for example by allowing a user to select a non-approved application, with feedback regarding the choice presented in some examples and the data in some embodiments stored for future use.

Figure 3:
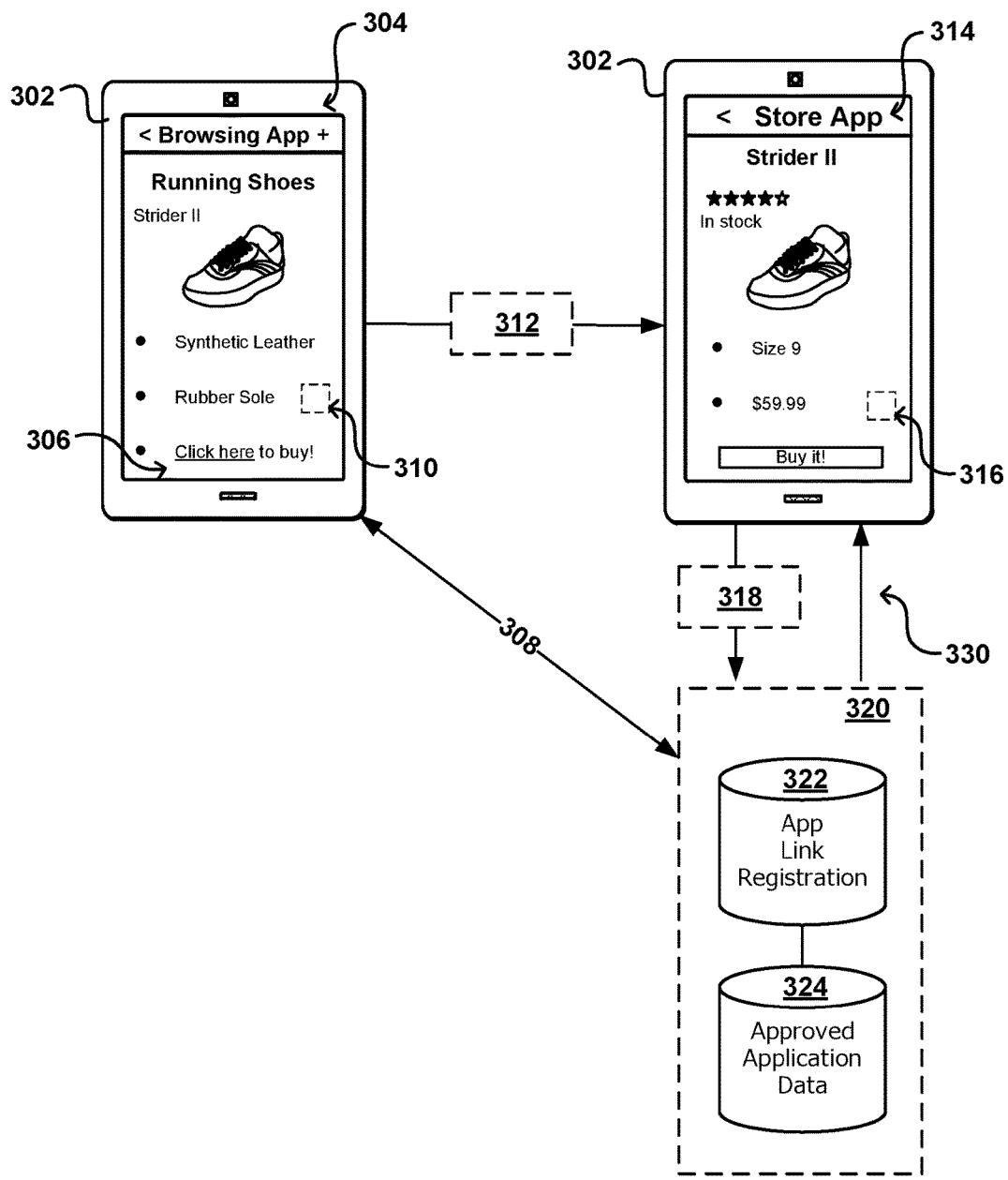
FIG. 3 illustrates an example situation wherein a calling application may be verified as an authorized application to invoke a target application in response to activating a link, in accordance with various embodiments.

FIG. 3 illustrates an example situation 300 wherein a calling application 304 may be verified as an authorized application to invoke a target application 314 in response to activating a link 306, in accordance with various embodiments. In the example of FIG. 3, a calling application executing on a computing device 302 has a link 306, which if activated, will request a target application to be invoked, as described herein. In this example, the calling application 304 sends a request 308 to data store 320 or other component, either on the computing device 302 or remotely maintained, to determine which target application is registered to handle the link; for example, by analyzing application link registration data 322. Once a target application is identified, a response 308 is sent to the calling application 304, which then sends a request 312 for invocation to the target application 314. The target application 314 then sends a request to data store 320 to determine whether the calling application 304 is an authorized calling application. For example, as described herein, the target application may specify a code signing certificate with which the calling application must be signed 310, which in some embodiments must match the code signing certificate used to sign the target application 316, although as discussed herein, various implementations may be utilized wherein an application may be deemed as "trusted" by another application, including the target application specifying to the platform applications, or criteria/characteristics of applications it will accept links from. For example, the target application may communicate 318 a fingerprint to the data store 320 (or platform, etc.) identifying particular applications/certificates/criteria that indicate an application as trusted, as described earlier.

The data store 320 determines whether the calling application is approved, for example by analyzing and comparing data associated with the calling application 304 to approved application data 324, as well as constraints that may be associated with the request 312, as described earlier. If the calling application 304 is indicated as approved, a response 330 is sent to the target application 314 indicating that the target application can process the invocation 312 and accept the data associated with the link 308.

In an embodiment, the calling application may comprise, for example, a web browser that is accessing a web page using a HTTPS connection; for example, a connection secured with a SSL certificate or similar approach. This web browser may, for example, be executing on a different device than the potential target application, or may comprise a redirect from a website. The web browser may then cause an attempt to invoke a target application on the same or different device, and information associated with the HTTPS connection (e.g., the SSL certificate) may be transmitted with the request. This information may be used to determine whether the calling application (e.g., the web browser) may be trusted, using techniques as described earlier.

Figure 4:
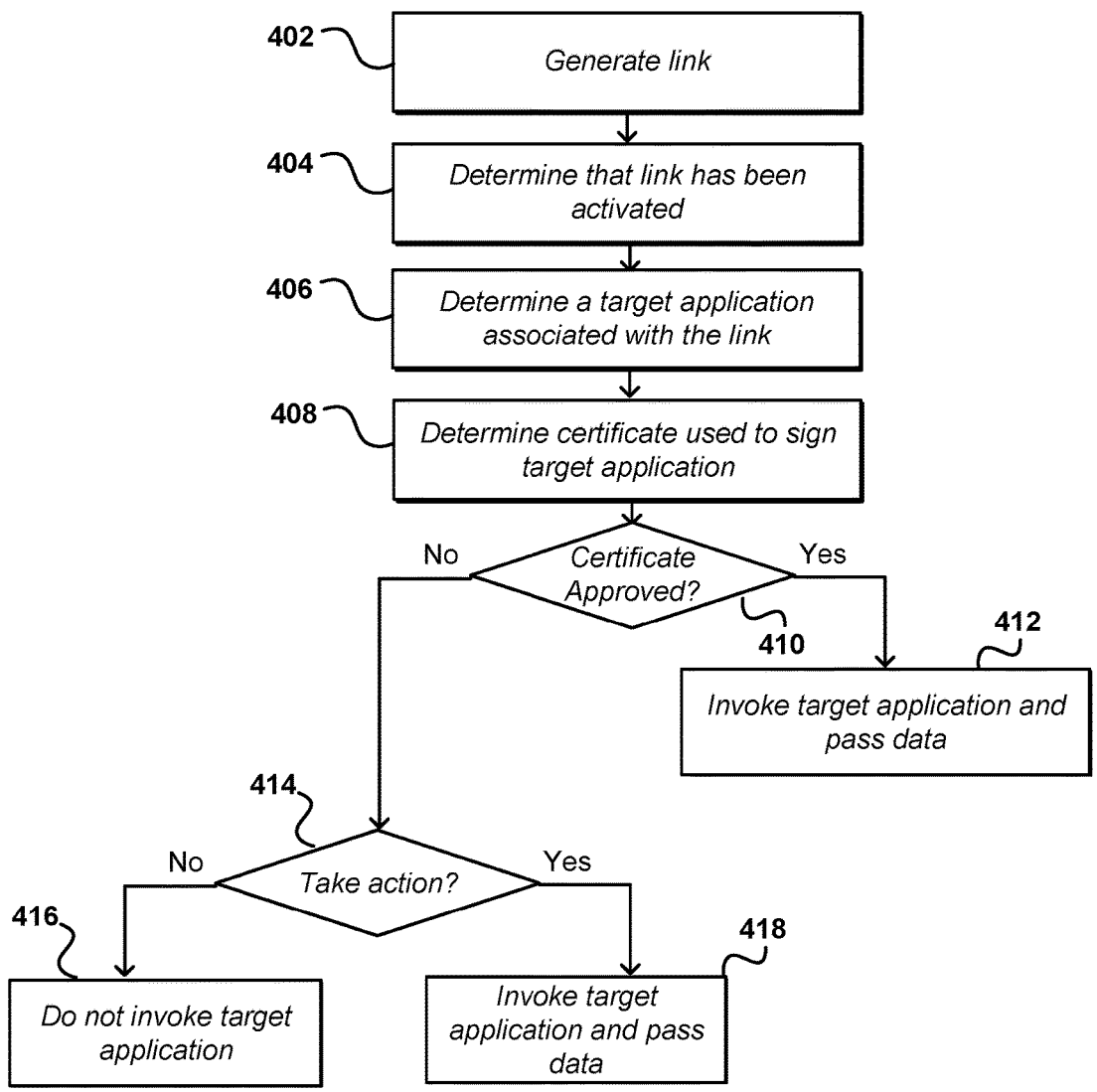
FIG. 4 illustrates an example process for preventing inter-application message hijacking, in accordance with various embodiments.

FIG. 4 illustrates an example process 400 for preventing inter-application message hijacking, in accordance with various embodiments. Although this figure and FIG. 5 below may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In this example, a link capable of being activated (e.g., clicked or otherwise selected) is generated or otherwise provided 402, for example in an application executing on a mobile device. This link may be generated by the system or by the application, prior to displaying a web page or on-the-fly as the web page is being generated, and may comprise many different forms rather than a simple URL/URI. A user may click on the link, and an indication that the link has been activated is received 404, for example by the platform, device, system, etc.

In response to the link being activated, a target application associated with the link is determined 406, for example pursuant to a URL scheme according to the device and/or platform's configuration. As discussed earlier, a link may have an action portion and a data portion, as well as other portions included in the link or otherwise associated and/or referenced by the link. The action portion may be determined to be associated with a particular target application on the device, multiple applications on the device, and/or an application executing on a separate device from the device on which the calling application is executing.

A determination is then made whether the target application is an authorized application; i.e., that the target application is trusted by the calling application and/or the platform to handle the link and receive any data that may be transmitted to the target application as a result of the link being activated. In an embodiment, this determination comprises determines a certificate used to sign the target application 408, although in other embodiments, other and/or additional characteristics of the target and/or calling application may be utilized.

In this example, a determination is made whether the certificate, or other data used for determining approval in other embodiments, is approved 410; for example, whether the certificate matches a certificate used to sign the calling application, or whether the certificate is otherwise approved, for example by being on a whitelist of certificates.

If the certificate is approved 412, then the target application is invoked and any data associated with the link is passed to the target application. If the certificate is not approved, then a determination can be made 414 whether to take some action with regard to the request and/or message; for example, perhaps no action is possible, or a setting has been selected indicating that any invocation is to be denied if the certificate or other data is not approved. If an action is to be taken 418, then for example, the request and/or message could be analyzed to see if it is possible to sanitize the message in some way; for example, by stripping out confidential and/or sensitive information, encrypting the contents of all or part of the message, or transforming some or all of the message, and then invoking the application and passing the data in whatever format it has been altered to become. In some embodiments, the message will be stripped entirely and the application invoked without the data being passed. Also, a message could be displayed to a user indicating circumstances of the determination about the trustworthiness of the target application, along with the reasons for the denial and what will happen to the data. An option may be presented to the user regarding what to do with the data; for example, offer to encrypt, sanitize, or otherwise transform the data in some way, or strip the data out completely. A preview of the data might be offered to the user for editing. Other actions may be taken; for example, attempting to determine another target application that is approved and that can handle the link. In an embodiment where processing or other steps are taken on a remote computing system such as a server, the remote computing system may be notified of the determination that the certificate is not approved. An application may be linked to a server side application, for example to receive data from and/or transmit data to. The calling application may pass a message to the server-side application; for example, to notify the server side application or component that the particular target application is registered to receive links with the particular action item, for example on this particular user's device. The message may provide information useful for fraud monitoring and/or detection. If no action is determined to be taken 416, then the request to invoke is not processed.

Figure 5:
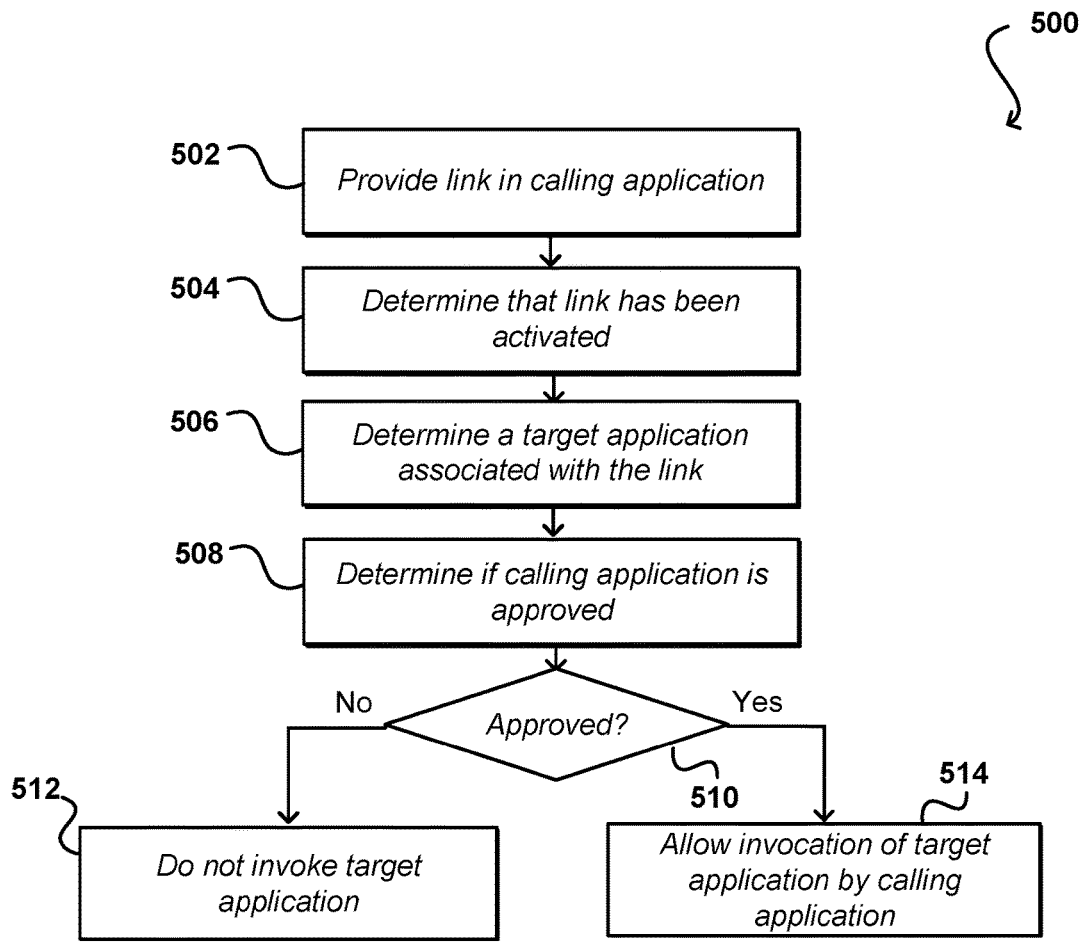
FIG. 5 illustrates another example process for preventing inter-application message hijacking, in accordance with various embodiments.

FIG. 5 illustrates another example process 500 for preventing inter-application message hijacking, in accordance with various embodiments. In this example, a link capable of being activated (e.g., clicked or otherwise selected) is generated or otherwise provided 502, for example in a calling application executing on a mobile device. This link may be generated by the system or by the application, prior to displaying a web page or on-the-fly as the web page is being generated, and may comprise many different forms rather than a simple URL/URI. A user may click on the link, and a determination that the link has been activated is received 504, for example by the platform, device, system, etc.

In response to the link being activated, a target application associated with the link is determined 506, for example pursuant to a URL scheme according to the device and/or platform's configuration. As discussed earlier, a link may have an action portion and a data portion, as well as other portions included in the link or otherwise associated and/or referenced by the link. The action portion may be determined to be associated with a particular target application on the device, multiple applications on the device, and/or an application executing on a separate device from the device on which the calling application is executing.

A determination 508 is then made whether the calling application is an approved application; i.e., that the calling application is trusted by the target application and/or the platform. In various embodiments, an application may be approved, authorized, or trusted by the platform but not approved, authorized, or trusted for inter-application communication (and vice versa), such as being invoked by another application through the techniques described herein, and/or to have data and/or other messages passed to it as part of the invocation process. A malicious calling application may attempt to send data to an application that could cause the target application to lose functionality, or attempt to attack the target application or the platform; for example, using code injection techniques. Based on the determination of criteria used to decide whether the calling application is approved, the result is determined 510. If the calling application is not approved 512, then the request to invoke is not processed. If the calling application is approved 514, then the target application is invoked and any data associated with the link is passed to the target application.

Figure 6:
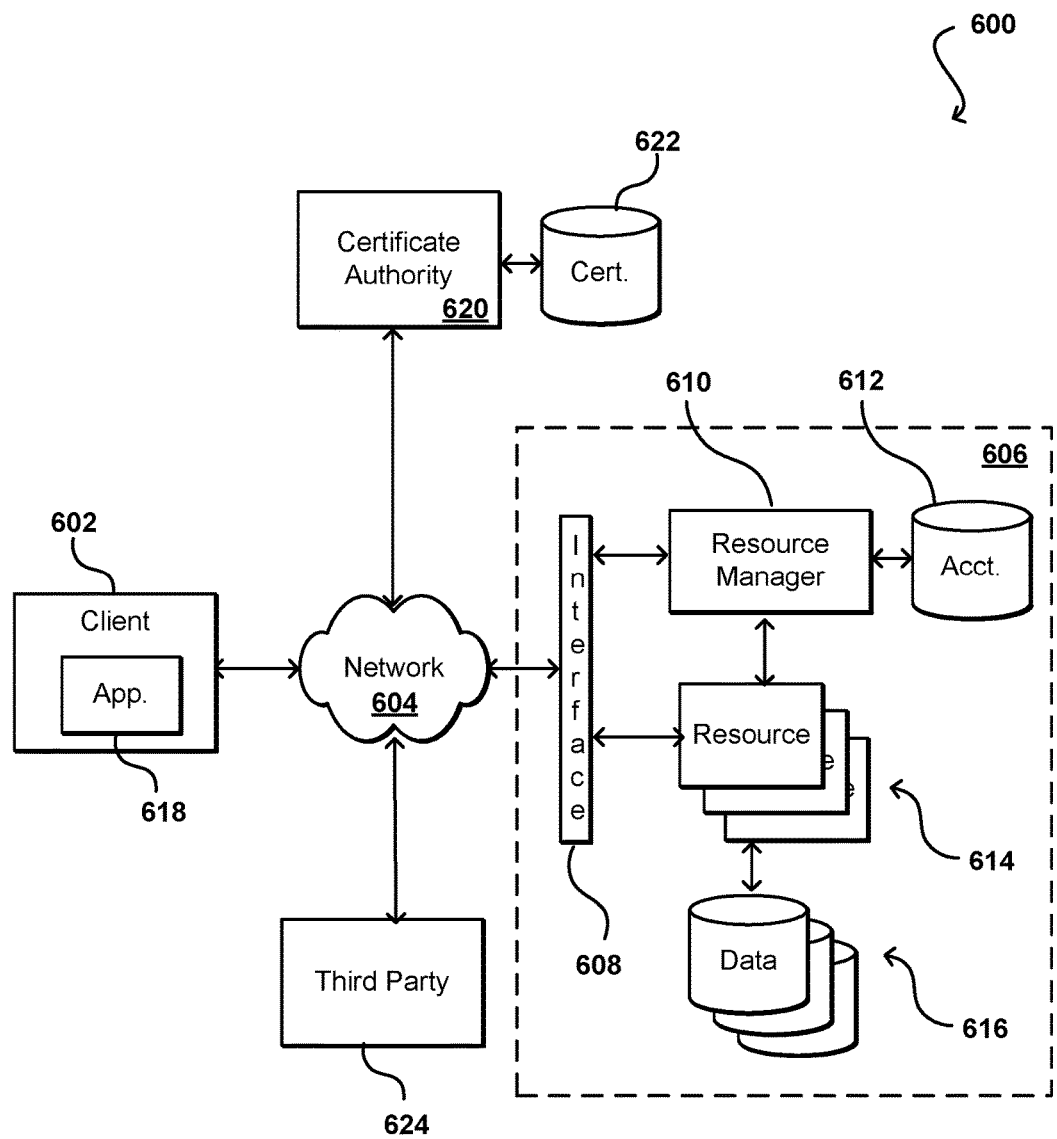
FIG. 6 illustrates an example environment in which aspects of the various embodiments can be implemented.

FIG. 6 illustrates an example environment 600 in which aspects of the various embodiments can be implemented. In this example a user is able to utilize a client device 602 to submit requests across at least one network 604 to a resource provider environment 606. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 604 can include any appropriate network, including an intranet, the Internet, a cellular network, a local area network (LAN), or any other such network or combination, and communication over the network can be enabled via wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment (i.e., a "multi-tenant environment") may include various types of electronic resources that can be utilized concurrently by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 614 of one or more types. These types can include, for example, application servers operable to process instructions provided by a user or database servers operable to process data stored in one or more data stores 616 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received at an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received at the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 602 to communicate with an allocated resource without having to communicate with the resource manager 610, at least until such time as a relevant aspect of the user account changes, the user is no longer granted access to the resource, or another such aspect changes.

The resource manager 610 (or another such system or service) in this example can also function as a virtual layer of hardware and software components that handles control functions in addition to management actions, as may include provisioning, scaling, replication, etc. The resource manager can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
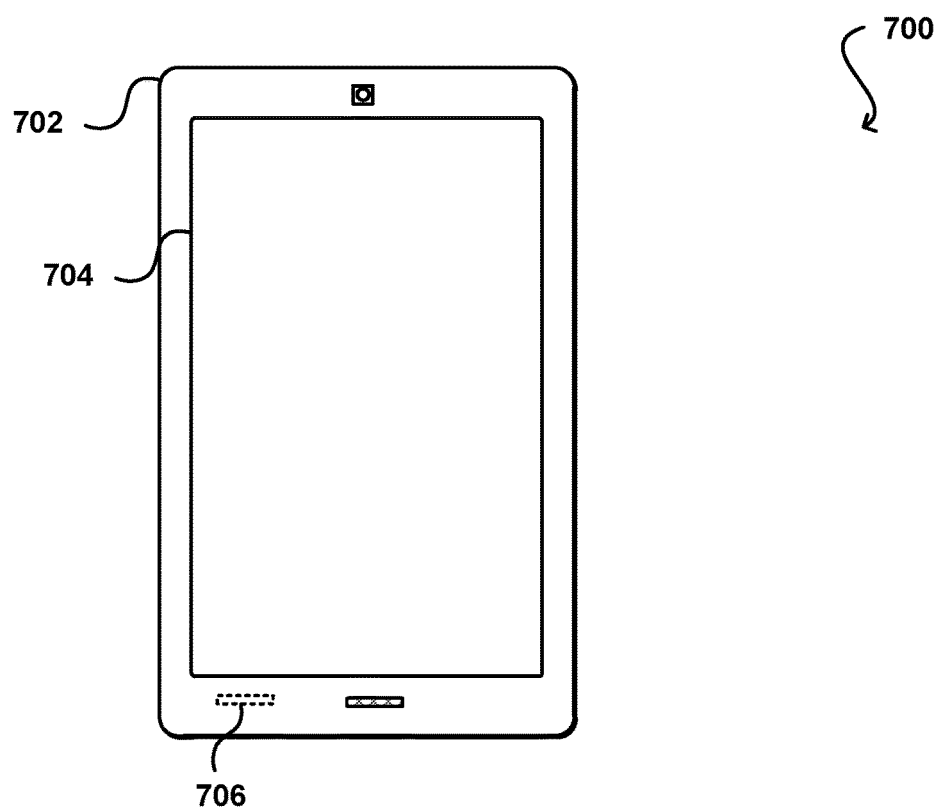
FIG. 7 illustrates an example computing device that can be used in accordance with various embodiments.

In at least some embodiments, a service provider such as a certificate authority (CA) 620 can perform various tasks, such as to provide a certificate or other information useful for verifying the identity of the user and generating information capable of verifying control over certain elements, setting up and/or initializing an email address, validating an alias, and the like. A user might be running an application 618 on a client device that is to perform a task, for example, requiring proof of control. In this example, the application 618 may send a request across the at least one network 604 to the resource provider environment 606 to have a resource 614 of the environment perform a specific task. Since the task requires verification of control, the client device 602 (or resource provider environment 606) can contact a certificate authority 620, or other service provider, to issue a certificate, or other such information, useful for providing such verification. The service provider can be any appropriate entity or authority known or used for such purposes, as may store information, credentials, issued certificates, and other information in a local data store 622 or other such repository. A certificate authority in general is a trusted provider that performs identity validation and other related tasks. As will be discussed later herein, such identifying information can be provided to verify control of the element, which can enable the resource environment 606 to perform various tasks, such as to set up secure communications with a third party system 624 that is associated with a particular domain, among other such options. A certificate from a certificate authority, or other such information from a service provider, can be sufficient to verify identity, but may not be sufficient to verify control in at least some situations FIG. 7 illustrates an example computing device 700 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

Figure 8:
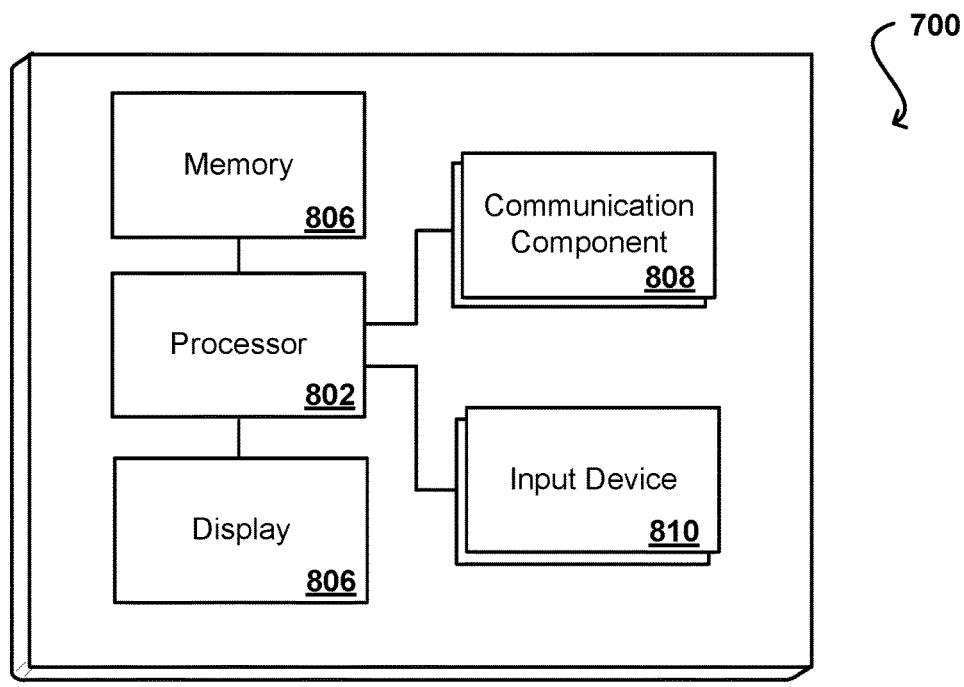
FIG. 8 illustrates a set of basic components of a computing device such as the device described with respect to FIG. 7.

In this example, the computing device 700 has a display screen 702, which under normal operation will display information to a user (or viewer) facing the display screen (e.g., on the same side of the computing device as the display screen). As discussed herein, the device can include one or more communication components 704, such as may include a cellular communications subsystem, Wi-Fi communications subsystem, BLUETOOTH® communication subsystem, and the like. FIG. 8 illustrates a set of basic components of a computing device 800 such as the device 800 described with respect to FIG. 7. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device typically will include at least one type of display element 806, such as a touch screen, electronic ink (e-ink), organic light emitting diode (OLED) or liquid crystal display (LCD), although devices such as portable media players might convey information via other means, such as through audio speakers. The device can include at least one communication component 808, as may enabled wired and/or wireless communication of voice and/or data signals, for example, over a network such as the Internet, a cellular network, a Wi-Fi network, BLUETOOTH®, and the like. The device can include at least one additional input device 810 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 9:
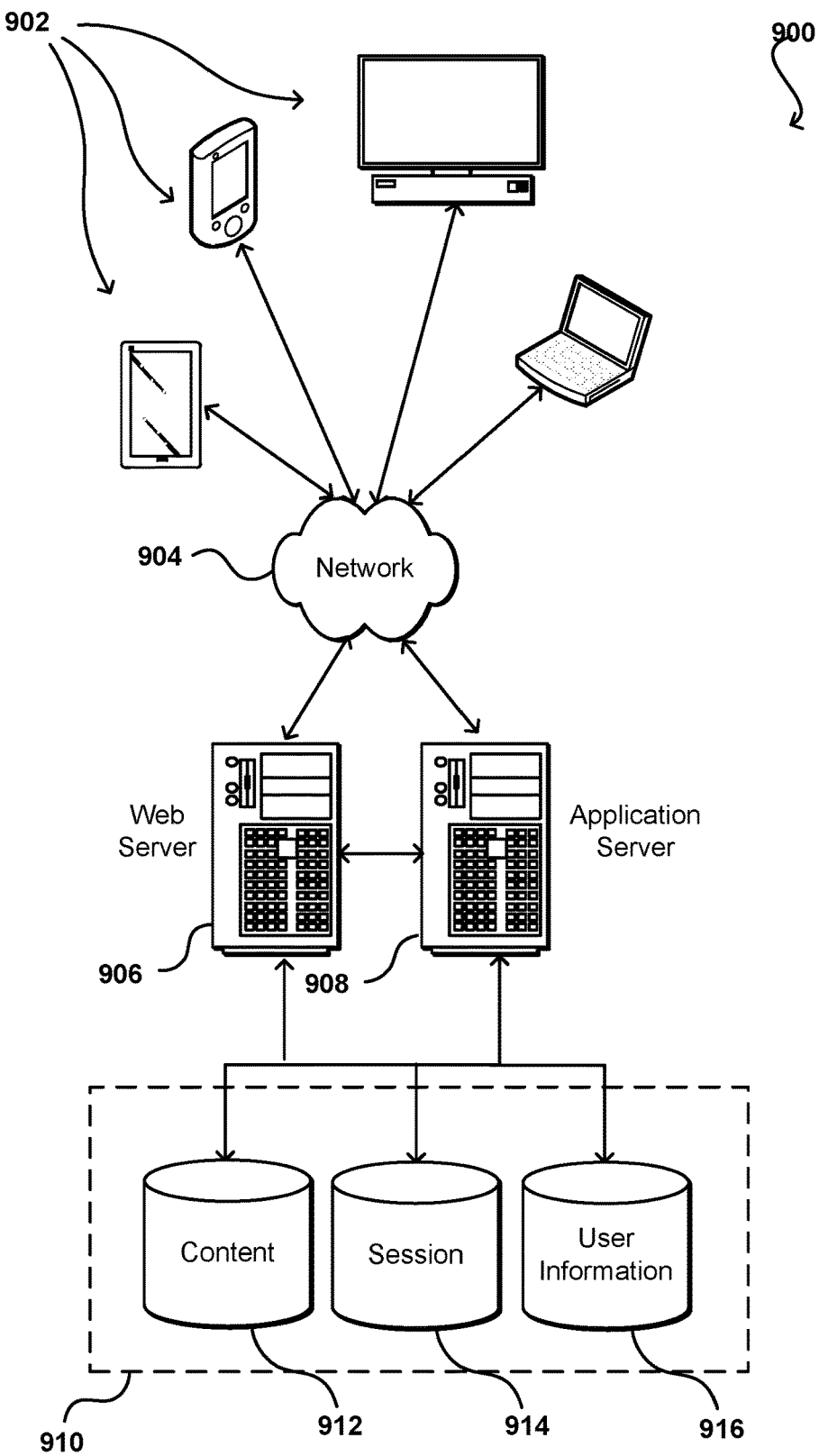
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

In the above description, various embodiments are illustrated by way of example and not by way of limitation in the figures of the accompanying drawings. References to various embodiments in the disclosure are not necessarily to the same embodiment, and such references mean at least one. While specific implementations and other details are discussed, it is to be understood that this is done for illustrative purposes only. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
   providing a link that, when activated causes an application associated with the link to be invoked on a computing device;
   receiving an indication of a selection of the link;
   determining, in response to receiving the indication, a target application associated with the link on the computing device;
   determining a calling application executing on the computing device, the calling application signed with a first resource;
   determining the target application is signed with a second resource;
   determining whether the target application is an authorized application to be invoked by the calling application in response to receiving the indication, the determining based at least in part on approval of at least one of a certificate match, certificate association, or a match between the first resource and the second resource; and
   causing, based at least on a determination that the target application is an authorized application, the target application to be invoked on the computing device and data associated with the link to be transmitted to the target application.

2. The computer implemented method of claim 1, wherein the first resource comprises a first code signing certificate, the second resource comprises a second code signing certificate, and wherein determining a match between the first resource and the second resource further comprises:
   determining that the first code signing certificate comprises an intermediary certificate; and
   determining that the second code signing certificate is signed by the intermediary certificate.

3. The computer implemented method of claim 1, wherein the first resource comprises a first code signing certificate, the second resource comprises a second code signing certificate, and wherein determining a match between the first resource and the second resource further comprises:
   determining that the first code signing certificate and the second code signing certificate are associated with a trusted certificate authority.

4. The computer implemented method of claim 1, further comprising:
   determining a calling application, executing on the computing device, in which the link was provided;
   determining a code signing certificate indicated as trusted by the calling application;
   creating fingerprint data corresponding to the trusted code signing certificate;
   causing the fingerprint data to be associated with the link; and
   determining that the target application is an authorized application, based on a determination that the target application is signed with a code signing certificate corresponding to the fingerprint data.

5. The computer implemented method of claim 1, further comprising:
   determining, in response to receiving the indication, a second target application executing on the computing device, the second target application associated with the link;
   determining that the second target application is an authorized application;
   causing a request for a selection of either the target application or the second target application to be displayed on the computing device; and
   receiving an indication of a selection of the target application.

6. The computer implemented method of claim 1, further comprising:
   determining a calling application, executing on the computing device, in which the link was provided;
   receiving, from the calling application, a whitelist comprising references to a plurality of code signing certificates; and determining, prior to causing the target application to be invoked on the computing device and data associated with the link to be transmitted to the target application, that the target application is signed with one of the plurality of code signing certificates referred to in the whitelist.

7. The computer implemented method of claim 1, further comprising:
determining a calling application, executing on the computing device, in which the link was provided;
modifying, by the calling application, the link to include flag data indicating that the calling application does not require the target application to be an authorized application; and
determining, by the computing device based on analyzing the flag data in response to receiving the indication of the selection of the link, that each application executing on the computing device, including the target application, is an authorized application.

8. The computer implemented method of claim 1, further comprising:
determining a time limit associated with the link;
modifying the link to include time data corresponding to the time limit;
determining, in response to receiving the indication, whether the time limit has expired by comparing the time limit with a time the indication was received; and
causing, based at least on the determination that the time limit has not expired, the target application to be invoked on the computing device and the data associated with the link to be transmitted to the target application.

9. The computer implemented method of claim 1, wherein determining whether the target application is an authorized application further comprises:
determining that the target application is signed with a particular resource;
sending, from the computing device, to an Application Programming Interface (API) executing on a second computing device, information capable of identifying the particular resource;
receiving, at the computing device from the second computing device, an indication whether the particular resource was included in a list of approved resources stored at the second computing device; and
determining, in response to receiving the indication, that the target application is an authorized application.

10. The computer implemented method of claim 1, further comprising:
determining whether the data associated with the link includes authentication credentials; and
determining, in response to determining that the data associated with the link includes authentication credentials, whether information associated with the target application satisfies at least two criteria, the at least two criteria selected from a group of criteria comprising: the target application being signed with a particular resource, a time limit associated with the link not having expired, the target application being included in an application whitelist, date of installation, or the target application having been previously executed.

11. A computing device, comprising:
at least one processor;
memory including instructions that, when executed by the processor, cause the computing device to:
provide, in a calling application executing on the computing device, a link that, when activated, causes an application associated with the link to be invoked on a computing device;
receive an indication of a selection of the link;
determine, in response to receiving the indication, a target application associated with the link on the computing device;
determine the calling application is signed with a first resource;
determine the target application is signed with a second resource;
determine whether the calling application is an authorized calling application to invoke the target application in response to receiving the indication, the determination based at least in part on approval of at least one of a certificate match, certificate association, or a match between the first resource and the second resource; and
cause, based at least on a determination that the calling application is an authorized calling application, the calling application to transmit data associated with the link to the target application.

12. The system of claim 11, wherein the instructions, when executed, further cause the computing device to:
modify the link to include information capable of verifying an identity of the calling application.

13. The system of claim 11, wherein the instructions, when executed, further cause the computing device to:
determine that the calling application comprises a web browser accessing a web page using a Hyper Text Transfer Protocol Secure (HTTPS) connection;
determine a digital certificate associated with the HTTPS connection; and
determine, based at least on a source of the digital certificate, that the calling application is an authorized calling application.

14. The system of claim 11, wherein the first resource comprises a first code signing certificate and the second resource comprises a second code signing certificate, and wherein determining a match between the first resource and the second resource comprises instructions that, when executed, further cause the computing device to:
determine that the first code signing certificate and the second code signing certificate are associated with a trusted certificate authority.

15. A non-transitory computer-readable storage medium including instructions that, when executed by at least one processor of a computing device, cause the computing device to:
provide, in a calling application executing on the computing device, a link that, when activated, causes an application associated with the link to be invoked on a computing device;
receive an indication of a selection of the link;
determine, in response to receiving the indication, a target application associated with the link on the computing device;
determine the calling application is signed with a first resource;
determine the target application is signed with a second resource;
determine whether the calling application is an authorized calling application to invoke the target application in response to receiving the indication, the determination based at least in part on approval of at least one of a certificate match, certificate association, or a match between the first resource and the second resource; and cause, based at least on a determination that the calling application is an authorized calling application, the calling application to transmit data associated with the link to the target application.

16. The non-transitory computer-readable storage medium of claim 15, wherein the instructions when executed further cause the computing device to:
    modify the link to include information capable of verifying an identity of the calling application.

17. The non-transitory computer-readable storage medium of claim 15, wherein the instructions when executed further cause the computing device to:
    determine that the calling application comprises a web browser accessing a web page using a Hyper Text Transfer Protocol Secure (HTTPS) connection;
    determine a digital certificate associated with the HTTPS connection; and
    determine, based at least on a source of the digital certificate, that the calling application is an authorized calling application.

18. The non-transitory computer-readable storage medium of claim 15, wherein the instructions when executed further cause the computing device to:
    determine that the calling application is signed with a first resource;
    determine that the target application is signed with a second resource; and
    determine a match between the first resource and the second resource.

* * * * *